US006896833B2

(12) United States Patent
Chadwick

(10) Patent No.: US 6,896,833 B2
(45) Date of Patent: May 24, 2005

(54) METHOD OF MOUNTING A DEVICE IN A WALL OR CEILING

(76) Inventor: Bernard L. Chadwick, 12461 Vaughan Rd., Poway, CA (US) 92064

(*) Notice: Subject to any disclaimer, the term of this patent is extended or adjusted under 35 U.S.C. 154(b) by 56 days.

(21) Appl. No.: 10/200,378

(22) Filed: Jul. 19, 2002

(65) Prior Publication Data

US 2003/0034426 A1 Feb. 20, 2003

Related U.S. Application Data

(62) Division of application No. 09/814,676, filed on Mar. 21, 2001, now abandoned.

(51) Int. Cl.[7] .......... B29C 33/40
(52) U.S. Cl. .......... 264/227; 264/333
(58) Field of Search .......... 264/227, 333; 52/27, 36.4, 741.1, 514

(56) References Cited

U.S. PATENT DOCUMENTS

| | | | | |
|---|---|---|---|---|
| 1,775,768 | A | | 9/1930 | Kenerson |
| 1,908,586 | A | | 5/1933 | D'Olier, Jr. |
| 3,298,764 | A | | 1/1967 | Goldfarb |
| 4,134,625 | A | | 1/1979 | Palka |
| 4,794,207 | A | * | 12/1988 | Norberg et al. .......... 174/48 |
| 5,287,665 | A | * | 2/1994 | Rath, Jr. .......... 52/220.8 |
| 5,379,199 | A | | 1/1995 | Hirshenhorn et al. |
| 5,405,196 | A | | 4/1995 | Shoup et al. |
| D361,639 | S | | 8/1995 | Christopoulos |
| 5,440,854 | A | | 8/1995 | Hohmann |
| 5,484,196 | A | | 1/1996 | Kim |
| 5,755,070 | A | | 5/1998 | Hohmann |
| 5,974,753 | A | | 11/1999 | Hsu |
| 6,089,685 | A | | 7/2000 | Ryan et al. |
| 6,115,977 | A | | 9/2000 | Hornberger |
| 6,338,225 | B1 | * | 1/2002 | Hayes .......... 52/27 |
| 2003/0014939 | A1 | * | 1/2003 | DeWall .......... 52/741.1 |
| 2003/0123679 | A1 | * | 7/2003 | Dudleston et al. .......... 381/87 |

OTHER PUBLICATIONS

HITW Series, Engineered Lighting Products, first published 1990.
HITW Series, Engineered Lighting Products, first published 1994.
GRG Architectural Lighting Fixtures, HITC and HITW Series, Engineered Lighitng Products 2002 (HITC Series first available 1994; HITW Series first available 1990).

* cited by examiner

*Primary Examiner*—Leslie A. Braun
*Assistant Examiner*—A. Joseph Wujciak
(74) *Attorney, Agent, or Firm*—Gordon & Rees LLP

(57) ABSTRACT

A wall mountable device has a body of predetermined shape for forming a wall feature and a flat, peripheral flange of predetermined width projecting outwardly from the perimeter of the body. The body may be a light sconce or valance, niche, shelving unit, bas-relief, or other wall feature. The flange has a periphery of predetermined shape for mounting in a wall opening of corresponding shape and dimensions with the outer face of the flange flush with the surrounding wall surface, and the seam or joint between the flange and wall opening is finished such that the body appears to be molded integrally with the wall.

4 Claims, 5 Drawing Sheets

METHOD OF MOUNTING A DEVICE IN A WALL OR CEILING

This application is a divisional of application Ser. No. 09/814,676 filed Mar. 21, 2001, now abandoned.

BACKGROUND OF THE INVENTION

The present invention relates generally to wall mountable devices or custom recessed building products such as light sconces, light valances, pre-manufactured recessed niches, pre-manufactured wall shelves, light covers, receptacle plug covers, vent covers, and the like.

A typical light sconce or other wall mountable device, regardless of its shape or design, is designed to have a flat back plate or panel so that it can be attached flat on top of the wall surface. The sconce is typically mounted with two screws to an electrical box that is mounted on the wood or metal wall studs behind the drywall. The back plate is on top of the drywall, projecting out from the wall in an unattractive manner, and leaving a cold joint or gaps at the point of connection to the wall. Additionally, wall mountable devices such as recessed niches, shelving, light sconces and valances have in the past mainly been custom made by hand, one at a time, by skilled craftsmen. Manufacture of such devices by hand, one at a time, makes them relatively expensive, and also gives rise to inconsistency in shape from one device to another, which is a problem where several are to be installed in one room or area.

SUMMARY OF THE INVENTION

It is an object of the present invention to provide a new and improved wall mountable device and method of mounting such a device in a wall.

It is another object of the present invention to provide a new and improved method of manufacturing such a wall mountable device.

According to one aspect of the present invention, a wall mountable device is provided, which comprises a body of predetermined shape for forming a wall feature, the body having a perimeter and a flat, peripheral flange projecting outwardly from the perimeter of the body, the flange having periphery of generally rectangular shape for mounting in a wall opening of corresponding shape and dimensions, such that the body can be recessed into the wall with the flange flush with the surrounding wall, whereby the body appears to be molded integrally with the wall.

In one exemplary embodiment of the invention, the wall mountable device comprises a light sconce of generally bowl-like shape having a recess with an upwardly facing opening in which a lightfitting can be recessed. The flat, peripheral flange surrounds the light sconce and is molded integrally with the sconce to form a continuation of rear wall of the sconce. An electrical junction box may be installed into the back of the molded device behind the recess. Alternatively, the device may be a recessed mounting panel for a wall socket cover plate, access panel, vent cover, switch plate or the like. The mounting panel has a central opening with a recessed peripheral rim surrounded by the peripheral flange. With this arrangement, cover plates, vent covers, and the like can be mounted in the recess flush with the wall, rather than projecting outwardly as in the conventional arrangement. Other wall mountable devices which may be formed with a peripheral flange for flush or recessed wall mounting include, shelving units, niches and the like. The wall feature need not necessarily be recessed, and may comprise a decorative feature such as a bas-relief, statue or the like. With this invention, such features will appear to be integrally formed with the wall itself, creating a smooth and attractive appearance.

According to another aspect of the present invention, a method of mounting a device in a wall is provided, which comprises the steps of taking a wall mountable device having a flat, outwardly projecting peripheral flange with a periphery of predetermined shape and dimensions, cutting an opening of predetermined shape and dimensions matching those of the flange periphery in a wall board, placing the wall mountable device in the opening with the flange flush with the surrounding wall surface, and securing the flange in the wall opening.

The perimeter seam or joint between the flange and edge of the wall opening may be covered by tape or the like, and the device and adjacent wall may then be coated with drywall mud or the like, then textured and painted, so that the wall mounted device or feature appears to be formed integrally with the wall. This method will permit various different types of wall mountable features or devices such as recessed lighting devices or sconces, recessed mounting panels for switch or socket plates, vent covers, and shelving units, niches or the like, to be mounted with their peripheral flanges flush in a wall opening, producing a much more decorative and pleasing effect.

The dimensions of the peripheral flange around the perimeter of the wall feature, such as a lighting sconce, must be sufficient for receiving a strip of drywall tape for covering the junction between the flange and wall opening. In practice, the peripheral flange width may be at least two inches around the entire border of the protruding wall feature.

According to another aspect of the present invention, a method of manufacturing a device for flush mounting in a wall opening is provided, which comprises the steps of forming a model of the device comprising a body and a peripheral flat flange with an outer peripheral edge, covering the model with a parting film, applying a coating layer of clay over the parting film to cover the upper surface of the model and extend down over the peripheral edge of the flange, pouring a shell of moldable material over the coating layer, allowing the shell to harden, removing the shell from the model and coating layer, removing the clay coating layer from the model, placing the shell over the model so that there is a cavity of thickness equal to that of the coating layer between the model and the shell, pouring a liquid mold material into the cavity, allowing the liquid mold material to cure to form a flexible liner, removing the shell, peeling the cured liner from the model, reinserting the liner into the shell, and pouring a liquid cement material into the liner to form a device which is a duplicate of the model.

This method allows any number of copies of an original wall mountable device or feature to be molded readily, rather than custom making each wall mountable device. This results in considerable time savings. The time savings over building a wall mountable device and installing it on top of a wall surface, compared to the time needed to mold the device with the integral flange and install it flush in a wall opening, are considerable. A time saving of about 75% faster for simple designs such as cover plates, register covers, access panels and the like can be achieved, while a time saving of 200% to 500% faster can be achieved for more complicated designs such as light sconces, valances, recessed niches, shelving units, and other artistic features.

BRIEF DESCRIPTION OF THE DRAWINGS

The present invention will be better understood from the following detailed description of an exemplary embodiment of the invention, taken in conjunction with the accompanying drawings in which like reference numerals refer to like parts and in which:

FIG. 17 is a sectional view of a panel with a recess instead of a sconce, the mounting being similar;

DETAILED DESCRIPTION OF THE DRAWINGS

Figure 1:
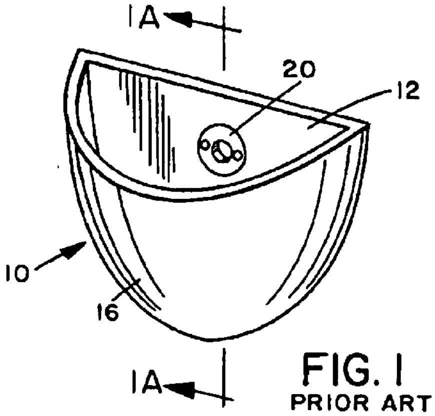
FIG. 1 PRIOR ART
FIG. 1 is a perspective view of a typical prior art sconce.
Figure 1A:
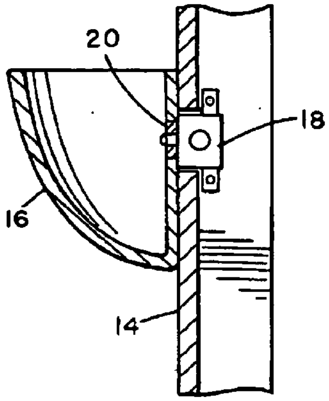
FIG. 1 A PRIOR ART
FIG. 1A is a sectional view taken on line 1A—1A of FIG. 1 showing the sconce mounted on a wall with an electrical outlet box.

FIGS. 1 and 1A illustrate a typical prior art light sconce 10 with a rear wall 12 adapted to be attached flat on top of a wall surface 14. The sconce 10 has an outwardly projecting, bowl-like form 16 with an upwardly directed opening. The sconce 10 is mounted with two screws to an electrical box 18 behind the wall which is secured to existing wood or metal wall studs. A light socket 20 is provided on the flat rear wall 12 for mounting a light bulb within the recessed region of the bowl, to produce a desired upwardly directed lighting effect. Prior art light valances are mounted in a similar manner.

The prior art installation method for such wall mounted features as light sconces and valances results in a cold joint or gaps at the point of connection to the wall, as well as an unattractive appearance with the rear wall of the feature projecting out from the wall. Additionally, features such as recessed niches, shelving, light sconces and valances are, for the most part, hand made one at a time by skilled craftsmen. A niche in drywall, for example, will be framed to a specific size and shape. Drywall will then be applied over the recessed frame to form the finished shape. Corner bead material is then installed, and the corner bead and all joints will be taped, floated, and then textured and painted to complete the feature. Other wall features are made in a similar manner, and are typically applied on top of the existing wall surface, so that they project out and do not integrate smoothly with the wall.

Figure 2:
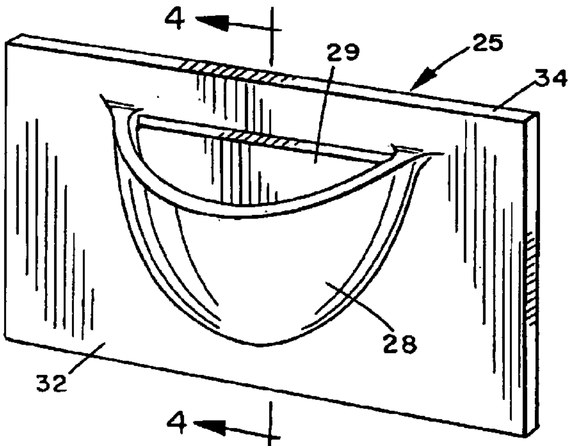
FIG. 2 is a perspective view of the new sconce with an integral mounting panel, according to one embodiment of the invention.

FIG. 2 of the drawings illustrates a light sconce panel 25 according to an exemplary embodiment of the present invention. The panel 25 is suitably formed of drywall type material such as Hydrocal™, which is a white gypsum cement available from U.S. Gypsum. The panel has a flat rear wall of generally rectangular shape with an integrally formed, protruding bowl or sconce 28 having a recess 29 with an upwardly facing opening 30. The wall dimensions are such that a periperal flange 32 extends around the entire perimeter of the bowl. The dimensions are such that the flange 32 projects for at least two inches around the entire perimeter of the bowl 28, and the outer periphery 34 of the panel is of rectangular shape. Other perimeter shapes such as square or round may be used, but a square or rectangular panel shape will allow easier wall mounting than other shapes. The outer dimensions of the panel will be dependent on the dimensions and peripheral shape of the feature incorporated in the panel. It will be understood that FIG. 2 illustrates one possible sconce or bowl shape, and that other shapes and dimensions may be used in other examples, with suitably adjustment of the panel dimensions to provide for the two inch surrounding flange. Additionally, panels may be provided with other wall features, such as downwardly facing light valances, niches or the like as described in more detail below.

Figure 4:
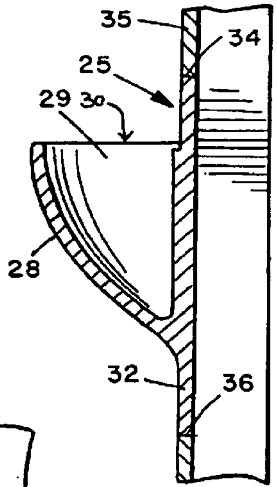
FIG. 4 is a sectional view taken on line 4—4 of FIG. 2 showing the panel mounted flush in drywall.
Figure 3:
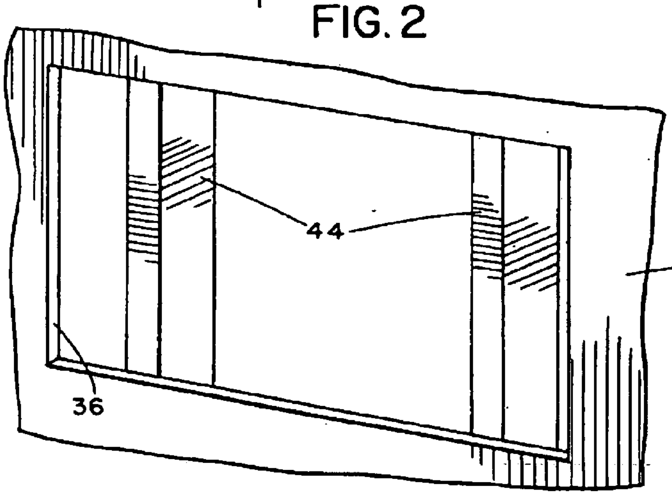
FIG. 3 shows a cut out made in drywall to receive the panel.
Figure 16:
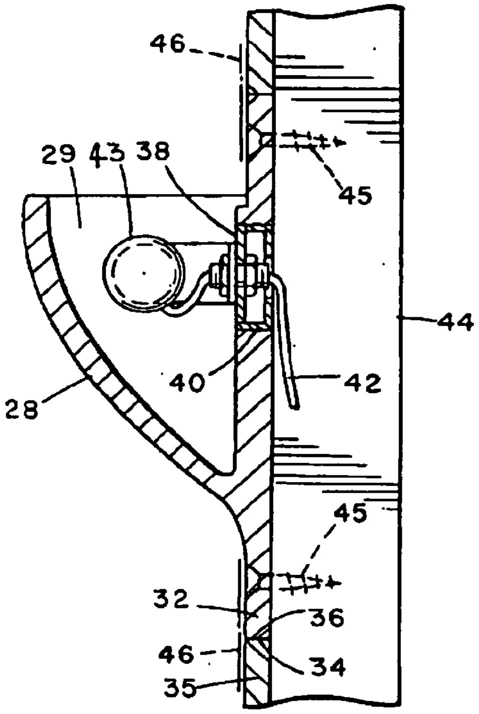
FIG. 16 is an enlarged view similar to FIG. 4 showing the installation of the panel with an electrical fitting for a light fixture.

A method of mounting a panel 25 in a wall 35 will now be described with reference to FIGS. 3, 4 and 16. First, panel 25 is held up to the wall at the position it is to be mounted, and a level is placed on the top edge of the panel. Once the panel is leveled, the periphery of the panel is marked with a pencil. Next, the wallboard is cut out along the pencil line with a rotary cutting tool or the like, leaving a rectangular opening 36 of dimensions matching those of the panel 25, as illustrated in FIG. 3. Any necessary electrical wiring is run to the wall cut out. Prior to mounting the panel in the wall opening, an electrical box 38 for a light fixture is installed in the rear wall of bowl 28, as illustrated in FIG. 16. Box 38 is mounted in an opening 40 cut in the panel, and may be secured in place by adhesive if necessary, or may simply be press-fit in the opening. Wiring 42 is then run into the electrical box at the back of the feature, and the panel 25 is positioned in the wall opening. The light fixture 43 is mounted to the box after the unit is completely installed and finished.

Prior to securing the panel 25 in the opening, the positions of studs 44 are suitably marked on the wall. If no stud is present, mounting clips may be positioned on the ends of the panel for securing the panel in the wall opening. If studs are present, countersunk holes are drilled at the top, bottom and sides of the flange 32 where the studs are marked, and drywall screws 45 are placed in each of the countersunk holes to secure the panel to the studs 44, as indicated in FIG. 16.

Once the panel has been mounted flush in the wall opening, as indicated in FIGS. 3 and 16, standard drywall mesh tape is applied around all four perimeter seams, as indicated in dotted outline in FIG. 16. Two to three successive coats of drywall mud are then applied over the panel and adjacent wall surfaces. When the seams are totally hidden, the surface is sanded to a smooth texture. Texture may then be applied to the entire feature, panel and sconce, to match the surrounding wall, and the feature may then be painted with the same paint as the surrounding walls.

It can be seen that the panel thickness is substantially the same as that of the surrounding wallboard, and that, once mounted and finished, the outer face of the flange 32 will be completely flush with the surrounding wall surface. Thus, the sconce appears to have been formed integrally with the wall itself, rather than being a completely separate feature, and there are no projecting edges, gaps, or cold joints. The panel is of sufficient width to span the gap between two wall studs 44, so that it can be securely fastened to two underlying studs.

Figure 17:
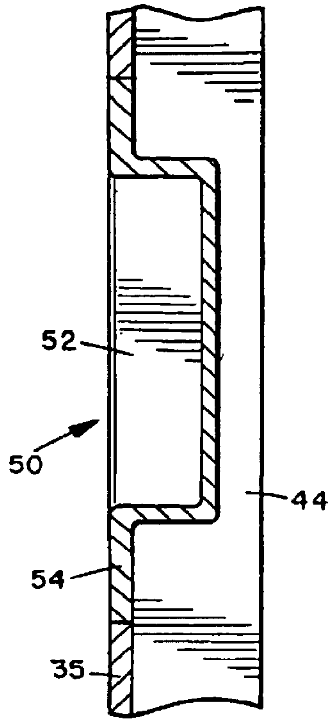

In the embodiment illustrated in FIGS. 2 to 4 and 16, the wall feature incorporated in the panel 25 is a lighting sconce. However, it will be understood that panels may be provided with other wall features and mounted in wall openings in a similar manner. In each case, the panel dimensions are sufficient to provide a peripheral flange of at least two inches around the entire periphery of the feature, so that the junction between the panel and wall opening can be finished to blend into the surrounding opening. FIG. 17 illustrates one alternative panel 50 incorporating a wall niche 52 in which paintings or other decorative items may be mounted. If desired, the niche 52 may be provided with peripheral lighting to light a painting or other item. The niche 52 may be of any desired shape, and has an integral peripheral flange 54 which is secured in the wall opening in the same manner as panel 25.

Figure 18:
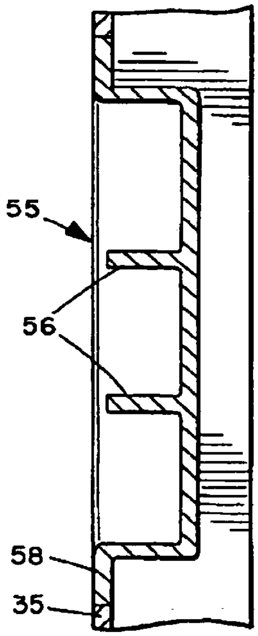
FIG. 18 is a sectional view of an alternative panel incorporating shelves which is mounted in the same manner as the previous embodiments.

FIG. 18 illustrates another alternative panel 55 incorporating recessed shelves 56 and a peripheral flange 58 mounted in a wall opening in the same manner as the previous embodiments. In other alternative examples, a panel may incorporate a bas-relief, sculpture, lighting valance, or the like, so that such features also appear to be integrally formed with the surrounding wall, rather than a separate feature mounted on top of a wall.

Figure 19:
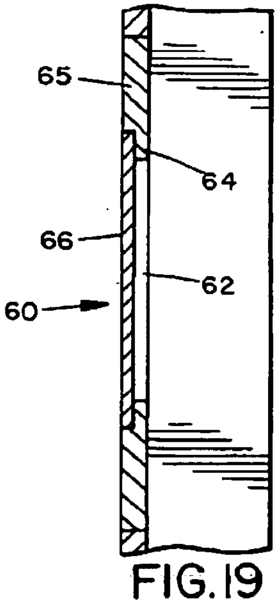
FIG. 19 is a sectional view of an alternative panel with a recess for mounting cover plates, vent covers, access panels and the like, shown mounted in a wall opening with a cover plate installed.

FIG. 19 illustrates a mounting panel 60 with a recessed central area having a central opening 62 and a recessed peripheral rim 64 which may be used for flush mounting of such features as light covers, wall sockets, wall switches, vent covers, and the like. The recessed opening has a flat peripheral flange 65 of predetermined dimensions which is fitted flush in a wall opening as indicated, and finished to appear an integral part of the wall. A conventional cover plate 66 or the like may then be secured in the recessed area and seated against rim 64. Plate 66 can be removably secured to rim 64 with screws or the like, allowing easy access for maintenance or replacement.

Figure 5:
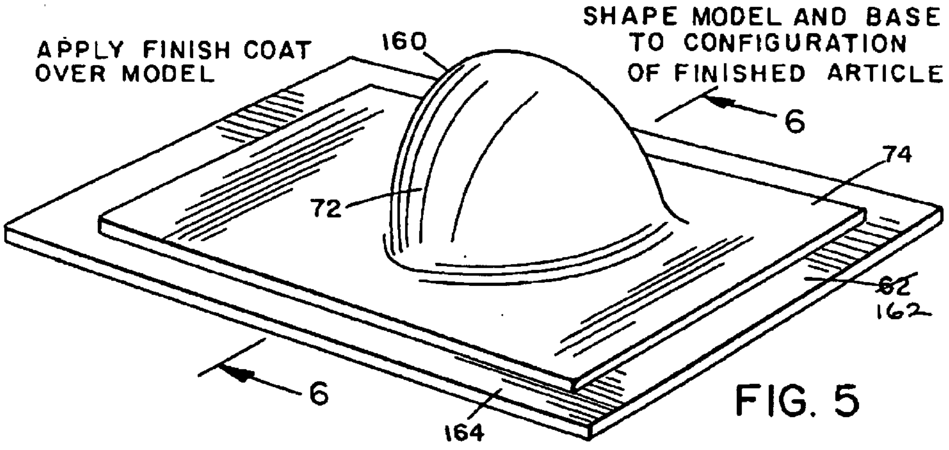
FIG. 5 is a perspective view of a mold of the sconce and panel mounted on a work platform.
Figure 6:
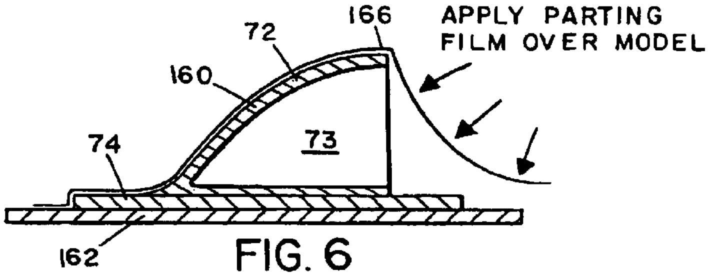
FIG. 6 is a sectional view taken on line 6—6 of FIG. 5 showing the initial preparation step.

FIGS. 5 to 15 illustrate an exemplary method of making a panel and integral wall feature, such as a light sconce as illustrated in FIG. 2, according to another aspect of the invention. The first step in the method is making a model or mold 160 out of clay in the desired shape of the finished product, as illustrated in FIGS. 5 and 6. The mold 160 in the illustrated method is of the same shape as sconce panel 25 of FIG. 2, with a bowl shape 72 forming a cavity 73 and a peripheral flange 74 surrounding the bowl. The mold or model 160 is formed on a base sheet 162 of wood or the like, with the sheet having a rectangular shape matching that of the finished article but around 1 to 2 inches larger on all sides, such that a peripheral edge portion 164 of the base sheet projects from the perimeter of the model 160 on all sides. The clay is then shaped on top of the base sheet to the configuration of the finished article. Once the model is complete, several layers of finish coat such as lacquer are sprayed on top the seal the model.

Figure 7:
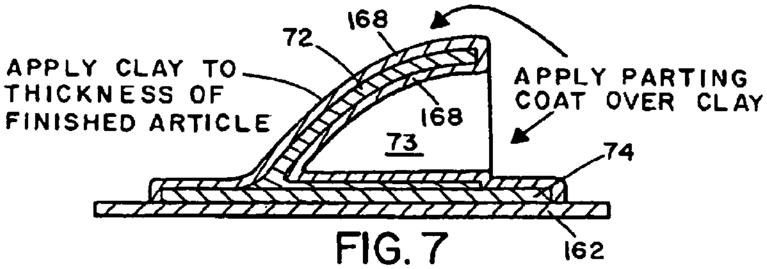
FIGS. 7–12 are similar sectional views showing the sequential steps in preparing the shaped liner for casting the product.

The entire model or mold 160 is then covered with a parting film 166 of cellophane or the like, as indicated in FIG. 6. After applying the parting film, a layer 168 of clay is rolled out to the desired thickness of the finished product, and then applied on top of the mold 160, as indicated in FIG. 7. A rim or dam 70 of clay is then formed at the top of the bowl 72, as indicated in FIG. 8, and a parting coat is applied over the clay.

Figure 8:
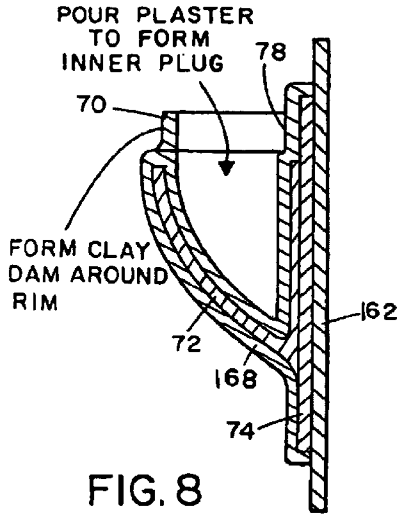
Figure 9:
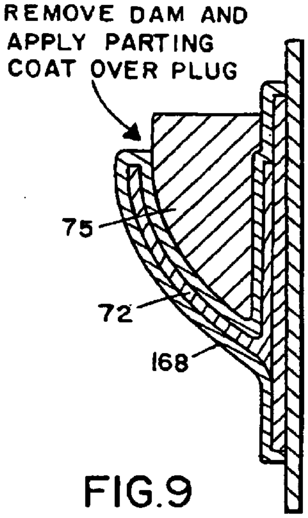

Plaster is then poured into the bowl 72 to form an inner plug 75, as indicated in FIGS. 8 and 9. The plaster is of any suitable material such as Hydrocal™ or the like. The dam 70 allows the plug shape to project around two inches beyond the rim of bowl 72. After the plug 75 is poured and set, the dam 70 is removed. Next, the portion of the plug 75 which projects out of the top of the bowl is painted with a suitable coating material such as shellac, and a thin layer of parting material such as Vaseline® or other lubricant is used to coat the exposed portion of the plug.

Figure 10:
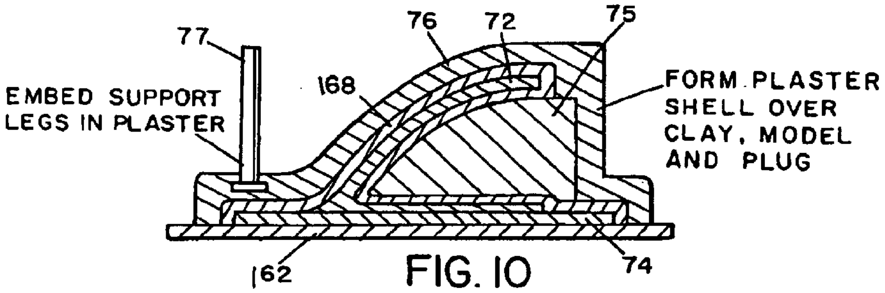
Figure 11:
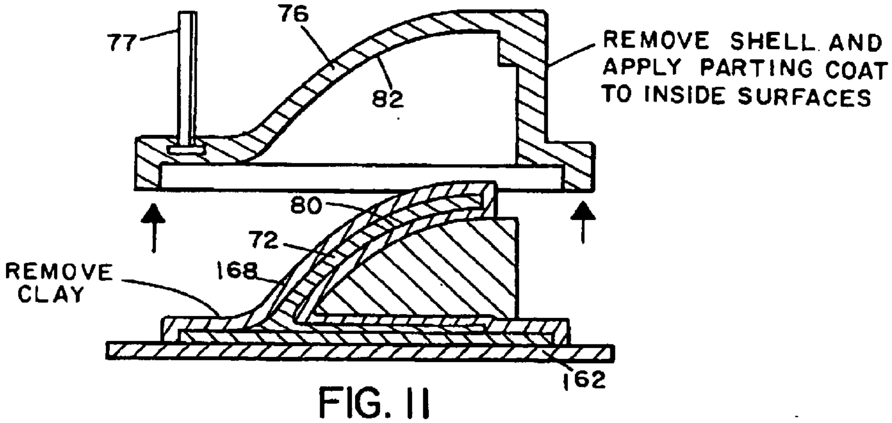

The next step of the method is illustrated in FIG. 10. In this step, a mixture of clay such as white gypsum cement and water is poured over the mold 160 and exposed portion of the plug 75. Layers of clay mixture and fiberglass mesh are applied over the model until an outer shell 76 of predetermined thickness is formed. In an exemplary embodiment, the shell 76 had a thickness of at least 0.5 inches. Support legs 77 are embedded in the plaster before it hardens. Once the outer shell 76 has hardened, it is removed carefully from the model, as indicated in FIG. 11. The parting material coating the model and exposed portion of the plug will ensure that the clay shell material does not stick to the model or plug as it is lifted away from the model. The inner clay layer 168 is then removed from the mold 160, after first taking out the plug 75. The plug is then replaced, seating in a suitable groove or the like provided in the lower wall 78 of the mold or model, or alternatively secured in place with bolts or the like, so as to leave a gap of predetermined thickness between the outer surface of the plug and the inner surface of the bowl where the clay layer 168 was removed.

Figure 12:
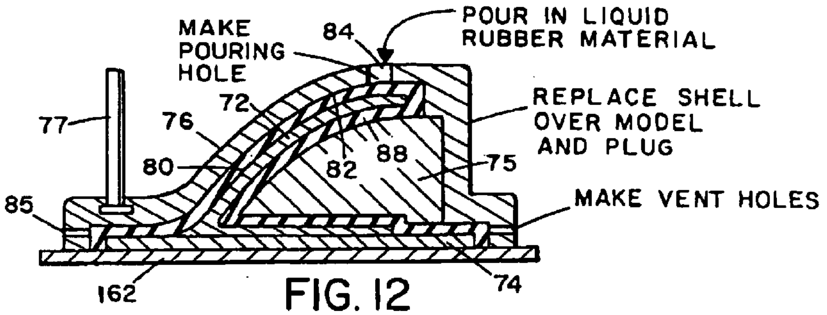
Figure 13:
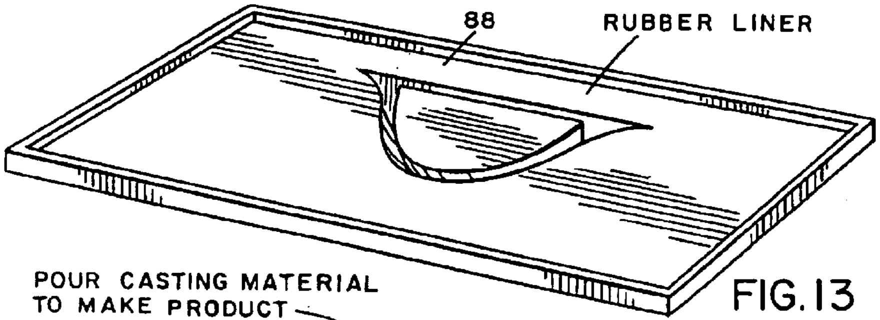
FIG. 13 is a perspective view of the rubber liner.

Several coats of sealer material such as shellac are then applied to the inner surface of the shell 76. The shell is then placed back over the mold or model 160 and plug 75, leaving a gap between the outer surface 80 of the model and the inner surface 82 of the shell 76, equal in thickness to the thickness of the removed clay layer 68. A pour hole 84 is then formed in the top of the shell 76. Vent holes 85 will also be provided around the edges of the shell. Liquid rubber is then poured in through hole 84, as indicated in FIG. 12, and will fill the gap between the shell and model and between the plug and the inner surfaces of the model. When rubber starts to flow out of the vent holes 85, the holes are plugged and the rubber is allowed to cure for 16 to 24 hours. The outer shell is then lifted off, and the plug is removed. The rubber liner 88 is then peeled off the model, and will have the shape illustrated in FIG. 13, which is a negative of the desired product shape illustrated in FIG. 2.

Figure 14:
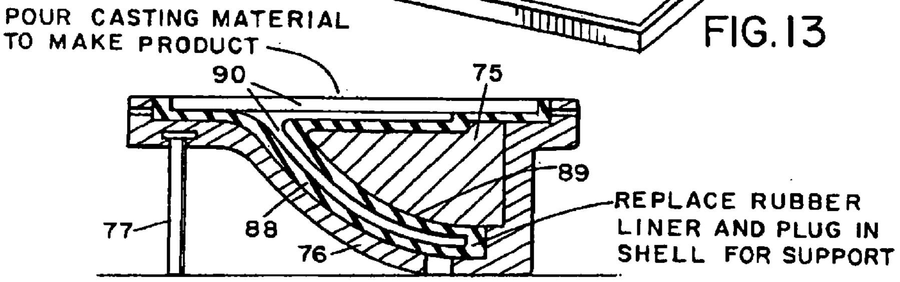
FIG. 14 is a sectional view showing the liner supported for casting.
Figure 15:
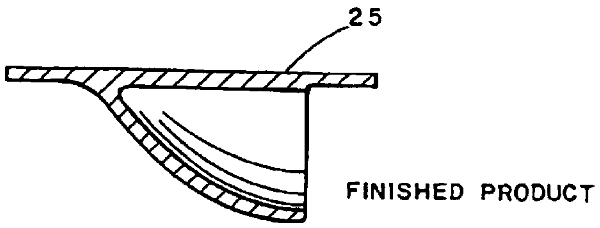
FIG. 15 is a sectional view of the finished product.

The outer shell 76 is then inverted, with the legs 77 supporting it horizontally on a table or the like, a indicated in FIG. 14. The rubber liner 88 is then placed into the shell 76. The plug 75 is placed into the cavity 89 of the liner and supported on the shell 76 so as to hold the liner in the desired position without collapse. A copy of the original model 160 can now be made. Casting material, such as a mixture of Hydrocal or plaster and water, is poured into the mold cavity 90. The mold may be shaken or vibrated to reduce air pockets, and is then left to stand for a predetermined time period while the Hydrocal hardens, typically at least 30 minutes. The finished product 25 is then removed from the mold and air dried for two to three days. The mold can then be re-used to form a plurality of successive sconce panels 25.

This method allows wall features such as light sconces, valances, niches and the like to be pre-manufactured in quantity, making them much less expensive and easier to manufacture. The wall features will be much more consistent in shape and quality than the previous hand-made features. The same basic method may be used to manufacture panels with features of different shapes, simply by appropriate shaping of the initial model. Thus, sconces of different shapes and size, valances, niches, shelves and the likes may be molded with an integral flange using the same basic technique as described above. This is much faster and significantly less expensive than the typical custom or hand making of wall features. Other decorative wall features such as bas-relief, statues, or the like may be molded with integral peripheral flanges in a similar manner. The feature integrally molded into the panel may be recessed inwardly into the wall, as in the case of the niche and shelving of FIGS. 17 and 18, or may protrude outwardly, as in the case of the sconce or other type of light housing.

The wall mounted device and method of this invention has numerous advantages over the prior art. First, the device is fully integrated and flush with the surrounding wall, so that it appears to have been formed with the wall itself, rather than a completely separate item stuck on top of the wall. This produces a unique and attractive appearance, without any exposed edges, gaps, or the like between the feature and the wall. Secondly, the feature itself is much more economical to manufacture, and can be mounted in the wall much faster than in the past. In the past, where such features were custom made by hand, then mounted on top of the wall, the process was much slower and inconsistent. With the present invention, installation of the pre-manufactured feature is about 75% faster than custom-building and installation of an equivalent feature in the case of a simple design, and about 200 to 500% faster for more detailed designs, and the feature will be consistent in shape and design.

Although an exemplary embodiment of the invention has been described above by way of example only, it will be understood by those skilled in the field that modifications may be made to the disclosed embodiment without departing from the scope of the invention, which is defined by the appended claims.

I claim:

1. A method of manufacturing a device for flush mounting in a wall opening, comprising the steps of:

forming a model of the device comprising a body having a perimeter and a peripheral flat flange of predetermined width extending around the perimeter of the body, the model having an upper surface;

covering the model with a parting film;

applying a coating layer of clay of predetermined thickness over the parting film to cover the upper surface of the model and extend down over the peripheral edge of the flange;

pouring a shell of moldable material over the coating layer;

allowing the shell to harden;

removing the shell from the model and coating layer;

removing the clay coating layer from the model;

placing the shell over the model so that there is a cavity of thickness equal to that of the coating layer between the model and the shell;

forming a pour hole in the shell;

pouring a liquid mold material for forming a flexible liner through the pour hole to fill the cavity;

allowing the liquid mold material to cure to form a flexible liner;

removing the shell from the model and liner;

peeling the cured liner from the model;

inverting the shell and reinserting the liner into the shell; and pouring a liquid cement material into the liner to form a device which is a duplicate of the model.

2. The method as claimed in claim 1, wherein the body is a bowl shape having a cavity with an opening facing in a direction parallel to the plane of the flange, and including the additional steps of inserting a plug into the model cavity and supporting the plug to leave a gap between the inner surface of the cavity and the plug, prior to forming the shell over the model and plug, and, after forming the shell, pouring the liquid molding material to fill the gap between the model, plug and shell which is a negative of the desired device shape.

3. The method as claimed in claim 1, wherein the liquid molding material is rubber.

4. The method as claimed in claim 2, including the additional step of embedding legs in the shell before it hardens in order to support the inverted shell in a horizontal orientation.

* * * * *